(12) United States Patent
Scott et al.

(10) Patent No.: US 8,748,007 B2
(45) Date of Patent: Jun. 10, 2014

(54) COATING COMPOSITIONS EXHIBITING CORROSION RESISTANCE PROPERTIES, RELATED COATED ARTICLES AND METHODS

(75) Inventors: Matthew S. Scott, Pittsburgh, PA (US); Richard F. Syput, Lower Burrell, PA (US); Steven R. Zawacky, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 995 days.

(21) Appl. No.: 12/108,758

(22) Filed: Apr. 24, 2008

(65) Prior Publication Data

US 2008/0199721 A1 Aug. 21, 2008

Related U.S. Application Data

(63) Continuation-in-part of application No. 11/610,069, filed on Dec. 13, 2006, now abandoned, which is a continuation-in-part of application No. 11/415,582, filed on May 2, 2006, now abandoned.

(51) Int. Cl.
| | |
|---|---|
| *B32B 15/08* | (2006.01) |
| *C04B 9/02* | (2006.01) |
| *C09K 3/00* | (2006.01) |
| *C23F 11/00* | (2006.01) |
| *B41M 5/20* | (2006.01) |
| *C25D 7/00* | (2006.01) |
| *H01M 4/02* | (2006.01) |

(52) U.S. Cl.
USPC ......... 428/626; 106/1.05; 106/14.05; 205/50; 252/387; 428/332; 428/615; 524/440

(58) Field of Classification Search
USPC ............. 106/14.05, 404, 1.17, 1.05; 428/615, 428/626, 416, 332; 524/440, 512; 204/489; 205/50; 252/387

See application file for complete search history.

(56) References Cited

U.S. PATENT DOCUMENTS

| | | | | |
|---|---|---|---|---|
| 2,680,108 A | 6/1954 | Schmidt | | 260/75 |
| 3,796,582 A | 3/1974 | Leahey et al. | | 106/1 |
| 4,026,710 A | 5/1977 | Kennedy | | 106/1 |
| 4,224,213 A * | 9/1980 | Johnson | | 524/439 |
| 4,346,143 A * | 8/1982 | Young et al. | | 428/332 |
| 4,544,581 A | 10/1985 | Pelloski | | 427/383.7 |
| 4,551,544 A | 11/1985 | Robbins | | 556/40 |
| 4,571,268 A | 2/1986 | Frain et al. | | 106/1.17 |
| 4,578,487 A | 3/1986 | Barfurth et al. | | 556/40 |

(Continued)

FOREIGN PATENT DOCUMENTS

WO  WO 2007/130838  11/2007

OTHER PUBLICATIONS

DuPont™ Tyzor® Organic Titanates and Zirconates A Broad Line of Versatile, High-Quality Solutions for Enhancing Your Products' Performance (2001) http://www2.dupont.com/Tyzor/en_US/index.html.*

(Continued)

*Primary Examiner* — Bijan Ahvazi
(74) *Attorney, Agent, or Firm* — Alicia M. Passerim

(57) ABSTRACT

Disclosed are coating compositions, such as primer compositions, suitable for providing corrosion protection to metal substrates, as well as related coated articles and methods.

28 Claims, 3 Drawing Sheets

(56) References Cited

U.S. PATENT DOCUMENTS

| | | | |
|---|---|---|---|
| 4,725,501 A * | 2/1988 | Rukavina et al. | 428/412 |
| 5,011,744 A * | 4/1991 | Saito et al. | 428/623 |
| 5,338,348 A | 8/1994 | Savin | 106/14.44 |
| 5,356,987 A * | 10/1994 | Stephenson | 524/512 |
| 5,393,353 A * | 2/1995 | Bishop | 148/253 |
| 5,393,567 A | 2/1995 | Wekenmann et al. | 427/372.2 |
| 5,413,628 A | 5/1995 | Savin | 106/14.44 |
| 5,652,024 A | 7/1997 | Sanborn et al. | 427/383.7 |
| 5,677,367 A | 10/1997 | Savin | 523/219 |
| 5,792,803 A | 8/1998 | Savin | 523/219 |
| 6,270,884 B1 | 8/2001 | Guhde et al. | 428/323 |
| 6,287,372 B1 | 9/2001 | Briand et al. | 106/14.05 |
| 6,398,861 B1 * | 6/2002 | Knox | 106/404 |
| 6,468,336 B1 | 10/2002 | Fiedler et al. | 106/14.21 |
| 6,485,550 B2 | 11/2002 | Hirose | 106/14.44 |
| 6,562,990 B1 | 5/2003 | St. Clair et al. | 556/40 |
| 6,638,628 B2 | 10/2003 | Savin | 428/446 |
| 6,663,968 B2 | 12/2003 | Grubb et al. | 428/413 |
| 6,750,274 B2 | 6/2004 | Gray et al. | |
| 6,960,247 B2 | 11/2005 | Endo et al. | 106/14.41 |
| 6,984,674 B2 | 1/2006 | Gray et al. | |
| 7,021,573 B2 | 4/2006 | Savin | 241/22 |
| 2004/0069637 A1 * | 4/2004 | Eswarakrishnan et al. | 204/489 |
| 2004/0134795 A1 | 7/2004 | Demarco et al. | 205/740 |
| 2004/0191555 A1 | 9/2004 | Germano | 428/553 |
| 2004/0206266 A1 * | 10/2004 | Maze et al. | 106/1.17 |
| 2005/0132932 A1 | 6/2005 | Kano | 106/635 |
| 2007/0134503 A1 * | 6/2007 | Espinosa | 428/450 |
| 2007/0256590 A1 * | 11/2007 | Scott et al. | 106/1.05 |
| 2007/0259172 A1 * | 11/2007 | Scott et al. | 428/332 |

OTHER PUBLICATIONS

Blitz pamphlet (Benda-Lutz Corporation, Kentucky). http://www.benda-lutz.com/cms/website.php?id=/en/index/produkte/zink.htm (no date).*

"Perforation Resistance of Precoated Steels in an Accelerated Automotive Test" by S. G. Fountoulakis, Bethlehem Steel Corp., SAE Technical Paper Series, International Congress and Exposition, Detroit, Michigan, Feb. 24-28, 1986, pp. 137-158.

"Hybrid Inorganic-Organic Materials: Novel Poly(propylene oxide) Based Ceramers, Abrasion Resistant Sol-Gel Coatings for Metals, and Epoxy-Clay Nanocomposites", Kurt Jordens, Dissertation submitted Aug. 3, 1999, pp. 12-25.

"Optimisation of Metallic Pigments in Coatings by an Electrochemical Technique and an Investigation of Manganese Powder as Pigment for Metal Rich Primers" by M. Selvaraj et al., Progress in Organic Coatings 28 (1996), pp. 271-277.

DuPont™ Tyzor® Organic Titanates, Technical Note—Coatings, E. I. du Pont de Nemours and Company, 2001.

N. Hall: "Blackening and Antiquing", Metal Finishing, Elsevier, Jan. 10, 1999, pp. 466, 469, 472, 474; vol. 97, No. 1, New York, NY.

* cited by examiner

COATING COMPOSITIONS EXHIBITING CORROSION RESISTANCE PROPERTIES, RELATED COATED ARTICLES AND METHODS

CROSS-REFERENCE TO RELATED APPLICATIONS

This application is a continuation-in-part of U.S. patent application Ser. No. 11/610,069, entitled, "Coating Compositions Exhibiting Corrosion Resistance Properties, Related Coated Articles and Methods", which was filed Dec. 13, 2006, and which is a continuation-in-part of U.S. patent application Ser. No. 11/415,582, entitled, "Coating Compositions Exhibiting Corrosion Resistance Properties, Related Coated Articles and Methods", which was filed May 2, 2006, both of which being incorporated herein by reference.

FIELD OF THE INVENTION

The present invention relates to coating compositions, such as primer compositions, suitable for providing corrosion protection to metal substrates, as well as related coated articles and methods.

BACKGROUND INFORMATION

Protection of metals from oxidation (rusting) and subsequent corrosion is often vitally important, such as, for example, when such metals are used to construct components incorporated into automotive, aerospace, architectural, and other industrial structures and parts. Various methods have been employed to achieve varying levels of corrosion protection.

In some cases, a galvanization process is used to impart corrosion protection to metallic surfaces. This process involves the hot-dip or electroplating application onto a metal substrate of a metal film deposited from a metal ingot. The metal of the metal film often has a greater ionization tendency than the metal of the metal substrate. As a result, as long as physical contact is maintained between the metal film and the substrate, the film is theoretically preferentially oxidized while the underlying substrate, which acts as an electrical conductor to transfer electrons from the metal film to oxygen, is protected.

Galvanization, however, is not ideal in all situations. For example, when utilizing hot dip galvanizing, it is difficult, if not impossible, to control the thickness of the metal film. As a result, hot dip galvanizing is not usually suitable in cases where corrosion protection is required for relatively small metal articles with complex shapes, such as fasteners, for example, nuts, bolts, and the like. Electroplating galvanization, on the other hand, while often enabling improved film thickness control over hot dip galvanizing, can be an expensive process due, for example, for the need to prevent "hydrogen embrittlement." This phenomena is known to occur during the plating process, wherein hydrogen is absorbed into the coated metal article and entrapped. Subsequently, the hydrogen can cause failure. As a result, additional, costly process steps are often employed to minimize or prevent hydrogen embrittlement.

In some cases, metal substrates are protected by use of corrosion-resisting primer coatings that incorporate metal particles, often zinc, as a metallic pigment. These coating compositions produce a coating that utilizes the same mechanism for corrosion protection as the metal films resulting from galvanizing. Often referred to as "zinc-rich primers", such coating compositions often outperform galvanization and are commonly applied to a metal substrate by a dip spin procedure. These compositions often incorporate zinc particles, often zinc flake, as the metallic pigment in combination with an organic binder, such as an epoxy resin and/or an inorganic binder, such as a silicate.

While "zinc-rich primers" developed heretofore are suitable in many applications, they do have certain drawbacks that can render them deficient in some cases. For example, to be effective, it has been believed that these compositions should deposit a continuous layer of metallic pigment, such as zinc, onto the metal substrate. When a powder, which is relatively inexpensive, is used, it is often important to apply the composition at relatively large film thickness, usually greater than 3 mils (76.2 microns), to ensure that a continuous layer of metallic pigment is deposited. The use of such thick films is, of course, undesirable from a cost standpoint. It can also render the use of such compositions impractical when corrosion protection is required for relatively small metal articles with complex shapes, such as fasteners, for example, nuts, bolts, and the like.

As a result of this perceived deficiency, metal flakes, such as zinc flakes, are often used as the metallic pigment in zinc-rich primer compositions. The use of these thin, plate-like structures, can result in the deposition of a continuous film of metallic pigment, even when the composition is deposited at a relatively low film thickness, even below 1 mil (25.4 microns). The nature of these materials, however, often causes the resultant coating to exhibit poor adhesion to a metal substrate as well as subsequently applied coatings. Thus, up to four dip applications of a solvent based colored coating composition is often applied over the primer (black is often a desired color). Moreover, aqueous based, electrodepositable coating compositions, which are often desirable for use as corrosion inhibiting coating compositions, often do not adhere to zinc-rich primers that rely on the use of commercial zinc flakes.

A disadvantage that has been observed in the use of inorganic binders in zinc-rich primer compositions is that they tend to be brittle and, therefore, the resulting zinc-rich primer composition can be powdery and exhibit poor adhesion to the metal substrate. This deficiency is particularly problematic when attempting to coat small parts, such as fasteners, which are handled in bulk. In this process, the parts often contact one another. As a result, when a brittle, poorly adhered film is applied to the parts, the film is easily damaged when the parts contact one another during the coating process. This damage leads to poor corrosion resistance performance.

As a result, it would be desirable to provide coating compositions that can impart desirable levels of corrosion protection to metal substrates even when applied at relatively low film thickness. Moreover, it would be desirable to provide such coating compositions that are flexible and adhere well to metal substrates as well as a subsequently applied aqueous electrodepositable coating compositions, to provide a desired color and a desirable level of corrosion protection to a metal article, such as small metal parts with complex shapes, such as fasteners, for example, nuts, bolts, and the like.

As previously mentioned, small metal parts, such as those mentioned above, are often handled in bulk during the coating process. In other words, many parts are coated simultaneously in a coating apparatus. In many instances, as indicated earlier, the individual parts come on close proximity to or contact each other while passing through the coating and drying systems such that when the coating is applied over the parts and dried or cured, two or more parts may adhere together at the point of engagement (often referred to as a "touch point"). These coated parts must then be separated from each other with some degree of force that, typically, results in the removal of at least some of the coating from each of the parts at or around the touch point. If a light, silver-colored (as is common) zinc-rich primer has been deposited under a dark, often black-colored (as is common) electrode-posited coating, removal of the dark electrodeposited coating will reveal the presence of the light undercoating, which is often unsightly and undesirable. As a result, it would be desirable to provide zinc rich coatings that have the flexibility and adhesion characteristics described above and which are dark in color, such as black, so that they exhibit a color similar to that of a subsequently applied electrodeposited coating.

SUMMARY OF THE INVENTION

In certain respects, the present invention is directed to dark-colored coating compositions comprising: (a) dark-colored metal particles, and (b) a film-forming binder comprising a hybrid organic-inorganic copolymer formed from: (1) a titanate and/or a partial hydrolysate thereof; and (2) a polyfunctional polymer having functional groups reactive with alkoxy groups of the titanate and/or partial hydrolysate thereof.

In other respects, the present invention is directed to dark-colored zinc-rich coating compositions comprising: (a) at least 25 percent by weight, based on the total solids weight of the composition, of dark-colored zinc flakes; and (b) a binder formed from a titanate.

In still other respects, the present invention is directed to metal articles at least partially coated with a multi-component composite coating comprising: (a) a dark-colored zinc-rich primer coating; and (b) a dark-colored electrodeposited coating deposited over at least a portion of the zinc-rich primer coating. These articles of the present invention are resistant to corrosion after 500 hours of exposure, when the total combined dry film thickness of the zinc-rich primer and the electrodeposited coating is no more than 1.5 mils (38.1 microns).

The present invention is also directed to methods for coating metal articles. These methods comprise: (a) depositing a dark-colored zinc-rich primer coating over at least a portion of a surface of the article, wherein the zinc-rich primer coating is deposited from a composition comprising: (1) at least 25 percent by weight, based on the total solids weight of the composition, of dark-colored zinc particles; and (b) a binder formed from a titanate; and (b) electrodepositing a dark-colored coating over at least a portion of the zinc-rich primer coating. In some embodiments, the total combined dry film thickness of the zinc-rich primer and the electrodeposited coating is no more than 1.5 mils (38.1 microns).

DETAILED DESCRIPTION OF THE INVENTION

Figure 1A:
FIGS. 1a and 1b are cross-sectional and surface scanning electron micrograph ("SEM") images (approximately 1000× magnification), respectively, of the coated substrate prepared in Example 15.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to coating compositions that comprise metal particles. The metal particles incorporated into the coating compositions of the present invention are selected to have a greater ionization tendency than that of the metal substrate to which the composition is to be applied. Thus, as is often the case, when the metal substrate is iron or an iron alloy, such as steel, the metal particles will typically comprise zinc particles, aluminum particles, zinc-aluminum alloy particles, or a mixture thereof. In some cases, the purity of the metal particles is at least 94% by weight, such as at least 95% by weight.

In certain embodiments, the coating compositions of the present invention are zinc-rich primer compositions. As used herein, the term "zinc-rich primer composition" refers to compositions comprising zinc particles, such as zinc powder, zinc dust, and/or zinc flake, which are present in the composition in an amount of at least 50 percent by weight, in many cases at least 70 percent by weight, such as 70 to 95 percent by weight, or, in some cases, 85 to 95 percent by weight, with the weight percents being based on the total weight of solids in the composition, i.e., the dry weight of the composition.

The particle size of the metal particles, such as zinc particles, can vary. In addition, the shape (or morphology) of the particles, such as zinc particles, can vary. For example, generally spherical morphologies can be used, as well as particles that are cubic, platy, or acicular (elongated or fibrous). In some cases, the metal particles comprise "metal powder", which, as used herein, refers to generally spherical particles having an average particle size of no more than 20 microns, such as 2 to 16 microns. In some cases, the metal particles comprise "metal dust", which, as used herein, refers to metal powder, such as zinc powder, having an average particle size of 2 to 10 microns. In some cases, metal particles comprise metal flakes, such as zinc flakes, which, as used herein, refers to particles having a different aspect ratio than powder or dust (i.e., not a generally spherical structure) and having an elongated dimension of up to 100 microns. In some cases, mixtures of metal powder, dust, and/or flakes are used.

In certain embodiments, the metal particles utilized in the coating compositions of the present invention comprise zinc powder and/or zinc dust. In certain embodiments, zinc powder is present in an amount of at least 25 percent by weight, such as at least 50 percent by weight, in some cases at least 80 percent by weight, and, in yet other cases, at least 90 percent by weight, based on the total weight of the metal particles in the coating composition.

Moreover, in certain embodiments, the coating compositions of the present invention are substantially free or, in some cases, completely free of zinc flakes. As used herein, the term "substantially free" means that the material being discussed is present, if at all, as an incidental impurity. In other words, the material does not effect the properties of another substance. As used herein, the term "completely free" means that the material is not present in another substance at all.

In certain embodiments, the coating compositions of the present invention comprise metal flakes comprising zinc alloy particles, such as zinc/aluminum and/or zinc/tin alloys, among others. Such materials, which are suitable for use in the present invention, are described in United States Published Patent Application No. 2004/0206266 at [0034] to [0036], the cited portion of which being incorporated herein by reference. Indeed, the inventors have surprisingly discovered that the addition of zinc-tin alloy particles in relatively small amounts, i.e., no more than 10 percent by weight, based on the total weight of solids in the composition, can result in significant improvement in the corrosion-resisting properties of certain coating compositions described herein. Such materials are commercially available from, for example, Eckart-Werke as STAPA 4 Zn Sn 15.

As indicated, certain embodiments of the present invention are directed to "dark-colored" coating compositions. As used herein, "dark" or "dark-colored" refers to materials that are black as well as materials having a color approaching black in hue, including, for example, dark grey, dark blue, dark green, dark brown, and the like. As used herein, "black" includes all dark, optically black colors. The term "optically black" refers herein to a material which appears black and opaque on visual inspection. In certain embodiments, the dark-colored coating compositions of the present invention are optically black.

In certain embodiments, the dark-colored coating compositions of the present invention are capable of producing a coating having a CIELAB L* value of no more than 60, such as no more than 50, or, in some cases, no more than 40. For purposes of the present invention, the L* value for a material is found as measured at an angle of 45° using an X-Rite MA-68 available from X-Rite, Incorporated, Grandville, Mich. The X-Rite MA-68 instrument measures according to the L*a*b color space theory. The L*a*b* color space theory states that every color can be plotted in a three dimensional space, with the lightness and darkness on the "L" (verticle) axis, the reds and greens on the "a" (left to right) axis and the yellows and blues on the "b" (front to back) axis. For lightness-darkness, measurements are made with particular reference to the L* values of the L*a*b* coordinates The dark-colored, sometimes optically black, coating compositions of the present invention comprise dark-colored metal particles. As used herein, the term "dark-colored metal particles" refers to metal particles, such as those described above, which themselves are dark-colored as defined above, sometimes optically black. In certain embodiments, the dark-colored metal particles themselves have a CIELAB L* value of no more than 60, such as no more than 50, or, in some cases, no more than 40. In other words, the metal particles are such that, and are present in an amount sufficient to, cause the resultant coating composition to be a dark-colored coating composition as defined above.

In certain embodiments, the dark-colored metal particles comprise black zinc flakes, such as those commercially available as Blitz® Z203 1 from Benda-Lutz Corporation, Independence, Kentucky. Indeed, it has been surprisingly discovered that the inclusion of such black zinc flakes does not detrimentally impact the ability of certain coating compositions of the present invention to adhere to subsequently applied aqueous based electrodepositable coating compositions, unlike as is often the case with other zinc flakes, as mentioned earlier. Particularly significant improvement in such adhesion has been found when the dry film thickness of the zinc-rich primer is at least 0.5 mils (12.7 microns), more particularly at least 0.7 mils (17.8 microns) or higher. As a result, the dark-colored coating compositions of the present invention are suitable for preparing metal articles at least partially coated with a multi-component composite coating comprising: (a) a dark-colored zinc-rich primer coating; and (b) a dark-colored electrodeposited coating deposited over at least a portion of the zinc-rich primer coating, wherein the article is resistant to corrosion after 500 hours of exposure when the total combined dry film thickness of the zinc-rich primer and the electrodeposited coating is no more than 1.5 mils (38.1 microns) and, in some cases, at least 1 mil (25.4 microns).

In certain embodiments, the dark-colored metal particles are present in an amount of at least 25 percent by weight, such as at least 50 percent by weight, in many cases at least 70 percent by weight, such as 70 to 95 percent by weight, or, in some cases, 85 to 95 percent by weight, with the weight percents being based on the total weight of solids in the composition, i.e., the dry weight of the composition.

The coating compositions of the present invention also comprise a binder, such as a film-forming binder. As used herein, the term "binder" refers to a material in which the metal particles are distributed and which serves to bond the coating composition to either a bare or previously coated substrate, such as a metal substrate. As used herein, the term "film-forming binder" refers to a binder that forms a self-supporting, substantially continuous film on at least a horizontal surface of a substrate upon removal of diluents and/or carriers that may be present in the composition.

In certain embodiments, the film-forming binder present in the coating compositions of the present invention comprises a hybrid organic-inorganic copolymer. As used herein, the term "copolymer" refers to a material created by polymerizing a mixture of two or more starting compounds. As used herein, the term "hybrid organic-inorganic copolymer" refers to a copolymer with inorganic repeating units and organic repeating units. For purposes of the present invention, the term "organic repeating units" is meant to include repeating units based on carbon and/or silicon (even though silicon is not normally considered an organic material), while the term "inorganic repeating units" is meant to refer to repeating units based on an element or elements other than carbon or silicon.

In certain embodiments, the film-forming binder utilized in certain embodiments of the coating compositions of the present invention is formed from a titanate and/or a partial hydrolysate thereof. As used herein, the term "titanate" refers to a compound comprising four alkoxy groups, which compound is represented by the formula $Ti(OR)_4$, wherein each R is individually a hydrocarbyl radical containing from, for example, 1 to 10, such as 1 to 8, or, in some cases 2 to 5 carbon atoms per radical, such as, for example, alkyl radicals, cycloalkyl radicals, alkylenyl radicals, aryl radicals, alkaryl radicals, aralkyl radicals, or combinations of two or more thereof, i.e., each R can be the same or different. Such materials, which are suitable for use in the present invention, are described in U.S. Pat. No. 6,562,990 at col. 4, line 63 to col. 5, line 9, the cited portion of which being incorporated herein by reference. Commercially available materials, which are examples of titanates that are suitable for use in the present invention, are the products sold by DuPont under the tradename TYZOR®, such as TYZOR TPT, which refers to tetraisopropyl titanate, TYZOR TnBT, which refers to tetra-n-butyl titanate, and TYZOR TOT, and which refers to tetra-2-ethylhexyl titanate.

In certain embodiments, the titanate used in preparing the film-forming binder utilized in certain embodiments of the coating compositions of the present invention is a chelated titanate. Suitable chelated titanates include, but are not limited to, products commercially available from DuPont under the TYZOR tradename. Suitable chelated titanates also include, but are not limited to, the chelated titanates described in U.S. Pat. Nos. 2,680,108 and 6,562,990, which are incorporated herein by reference. In certain embodiments of the present invention, a chelated titanate is used that is formed from the use of a chelating agent comprising a dicarbonyl compound. Dicarbonyl compounds that are suitable for use in preparing the titanium chelate utilized as a binder in certain embodiments of the coating compositions of the present invention include, but are not limited to, the materials described in U.S. Pat. No. 2,680,108 at col. 2, lines 13-16 and U.S. Pat. No. 6,562,990 at col. 2, lines 56-64.

In certain embodiments of the present invention, the film-forming binder is formed from the reaction of a titanate and/or a partial hydrolysate thereof, such as any of the titanates and/or chelated titanates previously described, and a polyfunctional polymer comprising functional groups reactive with alkoxy groups of the titanate and/or a partial hydrolysate thereof. As used herein, the term "polymer" is meant to include oligomers and both homopolymers and copolymers. Suitable polymers include, for example, acrylic polymers, polyester polymers, polyurethane polymers, polyether polymers and silicon-based polymers, i.e., polymers comprising one or more —SiO— units in the backbone. As used herein, the term "polyfunctional polymer" is meant to refer to polymers having at least two functional groups. As used herein, the phrase "formed from" denotes open, e.g., "comprising," claim language. As such, a composition or substance "formed from" a list of recited components refers to a composition or substance comprising at least these recited components, and can further comprise other, non-recited components, during the composition or substance's formation.

As indicated, the polyfunctional polymer utilized in the preparation of the film-forming binder of certain embodiments of the coating compositions of the present invention comprises two or more functional groups reactive with alkoxy groups of the titanate and/or partial hydrolysate thereof. Examples of such functional groups are hydroxyl groups, thiol groups, primary amine groups, secondary amine groups, and acid (e.g. carboxylic acid) groups, as well as mixtures thereof.

In certain embodiments, the polyfunctional polymer utilized in the preparation of the film-forming binder of certain embodiments of the coating compositions of the present invention comprises a polyhydroxy compound, i.e., a polyol. As used herein, the terms "polyhydroxy compound" and "polyol" refers to materials having an average of two or more hydroxyl groups per molecule. Suitable polyols include, but are not limited to, those described in U.S. Pat. No. 4,046,729 at col. 7, line 52 to col. 10, line 35, the cited portion of which being incorporated by reference.

In certain embodiments of the present invention, the polyol is formed from reactants comprising (i) a polyol, such as a diol (a material having two hydroxyl groups per molecule), comprising an aromatic group and (ii) an alkylene oxide. In these embodiments, the aromatic group containing polyol, such as a diol, may include one or more aromatic rings, and if more than one ring is present, the rings can be fused and/or unfused. Examples of aromatic group containing diols, which are suitable for use in the present invention, are bisphenols, such as Bisphenols A, F, E, M, P and Z. In these embodiments, the polyol undergoes chain extension by reaction with an alkylene oxide. The alkylene moiety of the alkylene oxide can have any number of carbon atoms, and can be branched or unbranched. Examples of suitable, but non-limiting, alkylene oxides are those having from 1 to 10 carbon atoms, such as those having 2 to 4 carbon atoms. Such compounds are widely commercially available.

In these embodiments, the polyol can be reacted with the alkylene oxide in any suitable molar ratio. For example, the ratio of aromatic diol to the alkylene oxide can be from 1:1 to 1:10, or even higher. Standard reaction procedures can be used to react the alkylene oxide to one or more of the hydroxyl groups of the polyol, and to further link the alkylene oxide groups to each other for additional chain extension. Alternatively, suitable materials are commercially available, such as from BASF, in their MACOL line of products. One suitable product is a material in which six moles of ethylene oxide are reacted with one mole of Bisphenol A, commercially available as MACOL 98B.

As a result, as will be apparent from the foregoing description, the film-forming binder utilized in certain embodiments of the coating compositions of the present invention comprises a structure represented by the general formula:

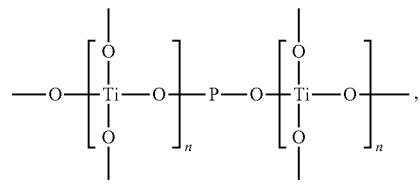

wherein P is the residue of a polyfunctional polymer, such as a polyol, such as a polyol formed from the reaction of a polyol comprising an aromatic group and an alkylene oxide; and each n is an integer have a value of 1 or more, such as 1 to 10, or, in some cases, n is 1, and each n may be the same or different. As will be appreciated, to obtain a structure as previously described wherein n is greater than 1, water may be added to the titanate to form a partial hydrolysate. This can be accomplished prior to addition of a polyfunctional polymer, with the polyfunctional polymer, or after the addition of the polyfunctional polymer. Otherwise, commercially available partial hydrolysates, such as TYZOR BTP (n-butyl polytitanate), can be used.

The Examples herein illustrate suitable methods for producing a film-forming binder utilized in certain embodiments of the coating compositions of the present invention. In certain embodiments, such a binder is produced by reacting a titanate and a polyfunctional polymer at a weight ratio of from 1 to 6, such as 3 to 5, parts by weight titanate, measured on the basis of theoretical $TiO_2$ content in the resulting binder, to 1 part by weight of the polyfunctional polymer. Indeed, it has been surprisingly discovered that use of a film-forming binder comprising the hybrid organic-inorganic copolymer formed from such a reaction can produce zinc-rich primer compositions wherein the amount of organic material is minimized, while still obtaining desirable film properties due to, it is believed, the presence of the organic repeating units. It is believed that this minimization of organic species is beneficial because such species can act as an insulator between zinc particles, thereby reducing their sacrificial activity. It is also believed that the minimization of organic species in the compositions of the present invention can render such compositions particularly suitable for use on metal parts that are intended to be utilized in relatively high temperature applications, where such organic species may degrade, such as, for example, automobile mufflers and the like.

In certain embodiments, the film-forming binder is present in the coating compositions of the present invention in an amount of 2 to 10 percent by weight, such as 3 to 7 percent by weight, with the weight percents being based on the total weight of solids in the composition, i.e., the dry weight of the composition.

The coating compositions of the present invention may include other materials, if desired. For example, in certain embodiments, the coating compositions of the present invention comprise a diluent so that the composition will have a desired viscosity for application by conventional coating techniques. Suitable diluents include, but are not limited to, alcohols, such as those having up to about 8 carbon atoms, such as ethanol and isopropanol and alkyl ethers of glycols, such as 1-methoxy-2-propanol, and monoalkyl ethers of ethylene glycol, diethylene glycol and propylene glycol; ketones, such as methyl ethyl ketone, methyl isobutyl ketone and isophorone; esters and ethers, such as 2-ethoxyethyl acetate and 2-ethoxyethanol; aromatic hydrocarbons, such as benzene, toluene, and xylene; and aromatic solvent blends derived from petroleum, such as those sold commercially under the trademark SOLVESSO®. The amount of diluent will vary depending on the method of coating, the binder component, the metal particles to binder ratio, and the presence of optional ingredients such as those mentioned below.

In addition to the ingredients described above, the coating compositions of the present invention may contain, for example, a secondary resin, a thickener, a thixotropic agent, a suspension agent, and/or a hygroscopic agent, including those materials described in U.S. Pat. No. 4,544,581 at col. 3, line 30 to col. 4, lines 64, the cited portion of which being incorporated herein by reference. Other optional materials include extenders, for example, iron oxides and iron phosphides, flow control agents, for example, urea-formaldehyde resins, and/or dehydrating agents, such as silica, lime or a sodium aluminum silicate.

In certain embodiments, other pigments may be included in the composition, such as carbon black, magnesium silicate (talc), and zinc oxide. In certain embodiments, the coating compositions of the present invention also include an organic pigment, such as, for example, azo compounds (monoazo, di-azo, β-Naphthol, Naphthol AS, azo pigment lakes, benzimidazolone, di-azo condensation, metal complex, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, as well as mixtures thereof.

The coating compositions of the present invention are substantially free or, in some cases, completely free, of heavy metals, such as chrome and lead. As a result, certain embodiments of the present invention are directed to "chrome-free" coating compositions, i.e., compositions that do not include chrome-containing substances.

One advantage of certain embodiments of the coating compositions of the present invention is that, unlike many prior art zinc rich primer compositions, they may be embodied as a single component, i.e., one-package, coating composition. As a result, the coating compositions of certain embodiments of the present invention can be easily prepared, stored, and transported.

The coating compositions of the present invention may be applied to a substrate by any of a variety of typical application methods, such as immersion, including dip drain and dip-spin procedures (after dipping, the article is spun in order to scatter any excess coating material by centrifugal force), curtain coating, rolling, brushing or spraying techniques.

Any article may be coated with the coating compositions of the present invention, such as, for example, those that are constructed of ceramics or plastics. In many cases, however, the article is a metal article and, as a result, the coating compositions are, in these embodiments, applied to a metal substrate, such as a zinc or iron containing substrate, e.g., a steel substrate. As used herein, the term "zinc substrate" refers to a substrate of zinc or zinc alloy, or a metal such as steel coated with zinc or zinc alloy, as well as a substrate containing zinc in intermetallic mixture. Likewise, the iron of the substrate can be in alloy or intermetallic mixture form.

In certain embodiments, the metal article to be coated with a coating composition of the present invention is a "small part". As used herein, the term "small part" is meant to include (i) fasteners, such as nuts, bolts, screws, pins, nails, clips, and buttons, (ii) small size stampings, (iii) castings, (iv) wire goods, and (v) hardware. In certain embodiments, the small part is a fastener to be used in an automotive and/or aerospace application.

In certain embodiments, such metal substrates comprise a bare uncoated or untreated surface. In other cases, however, the coating compositions of the present invention are applied to a metal substrate that has already been coated, such as with a chromate or phosphate pretreatment. In some cases, the substrate may be pretreated to have, for example, an iron phosphate coating in an amount from 50 to 100 $mg/ft^2$ or a zinc phosphate coating in an amount from 200 to 2,000 $mg/ft^2$.

The coating compositions of the present invention may be deposited onto the substrate at any desired film thickness. In many cases, however, relatively thin films, i.e., dry film thickness of no more than 0.5 mils (12.7 microns), in some cases no more than 0.2 mils (5.1 microns), are desirable. For purposes of the present invention, the dry film thickness of a coating or combination of coatings is to be measured by the eddy-current principle (ASTM B244) using, for example a FISHERSCOPE® MMS thicknessmeter, manufactured by Fisher Instruments, using the appropriate probe for the material of the coated substrate.

In certain embodiments, the coating compositions of the present invention are made and deposited in such a manner so as to produce a porous coating, such as a zinc rich coating, comprising non-spherical metal particles. It has been surprisingly discovered that when such a porous coating is deposited onto a metal substrate, either a bare metal substrate or a pretreated metal substrate, as described earlier, the ability of the coating to adhere to a subsequently applied coating, such as an electrodeposited coating, as described below, is dramatically improved while the corrosion resistance properties are not detrimentally effected and, in some cases, may actually be improved. In certain embodiments, the adhesion of the porous coating to a subsequently applied coating is improved to such an extent that the resulting multi-component composite coating is resistant to corrosion when tested in accordance with ASTM B 117 after 500 hours of exposure or, in some cases 700 hours of exposure, or, in yet other cases, 1000 hours of exposure, as described in more detail below.

As used herein, the term "porous coating" refers to a coating that has a discontinuous surface that is permeable to another coating composition, such as an electrodeposited coating composition, that is applied over the porous coating. In other words, a porous coating contains pathways sufficient to allow the subsequently applied coating composition to at least partially penetrate beneath the exterior surface of the porous coating. In certain embodiments, as illustrated in the Examples herein, such pathways are visible when viewing a scanning electron micrograph (approximately 1000× magnification) of a cross-section of the porous coating.

It has been discovered that such a porous coating can be made be a process comprising: (a) preparing a composition comprising: (i) generally spherical metal particles, (ii) a film-forming binder; and (iii) a solvent; and (b) converting at least some, preferably substantially all, of the generally spherical particles to non-spherical metal particles in the presence of the binder and the diluent. As used herein, the term "substantially all" means that the amount of generally spherical particles remaining in the composition after the converting step is not sufficient enough to detrimentally affect the performance of the resulting porous coating.

As used herein, the term "non-spherical particles" refers to particles that are not generally spherical, i.e., they have an aspect ratio greater than one, in some cases the aspect ratio is 2 or higher. Without being bound by any theory, it is believed that the process of the present invention results in the conversion of generally spherical metal particles to non-spherical metal particles having a variety of aspect ratios and sizes, such that when the composition is deposited on a substrate at the relatively thins film described herein, i.e., no more than 0.5 mils, a porous coating can result, as seen in the Examples. Conversely, as is also apparent in the Examples, if conventional zinc flake is used, such as Zinc 8 paste available from Eckart-America., the zinc flake particles orient themselves so as to form a non-porous coating having a continuous and relatively smooth exterior surface, perhaps due to the relatively uniform and large aspect ratios exhibited by such particles.

In accordance with the previously described process of the present invention, a composition comprising (i) generally spherical metal particles, (ii) a binder; and (iii) a diluent is prepared. In certain embodiments, such a composition is a composition of the present invention described herein, wherein the generally spherical metal particles comprise a metal having a greater ionization tendency than that of the metal substrate to which the composition is to be applied, as previously described, the binder comprises a hybrid organic-inorganic copolymer formed from: (a) a titanate and/or a partial hydrolysate thereof; and (b) a polyfunctional polymer having functional groups reactive with alkoxy groups of the titanate and/or the partial hydrolysate thereof, as previously described, and the diluent comprises one or more of the diluents previously described.

In these processes of the present invention, at least some, preferably substantially all, of the generally spherical particles are converted to non-spherical metal particles in the presence of the binder and the diluent. Any suitable technique may be used to accomplish the conversion, however, in some embodiments, a milling process, such as is described in the Examples, is used. In certain embodiments, this milling is carried out in a media mill using balls (constructed of, for example, zirconium ceramic) of 0.5 to 3.0 millimeters in diameter. In some cases, a media milling process in which the mill is loaded with balls in an amount of from 50 to 60% of the mill's internal volume is used. In some cases, a media milling process in which the composition comprising the generally spherical metal particles occupies from 50 to 75% of the mill's internal volume is used. Cooling may be provided to maintain internal temperature in the media mill of less than 140° F., such as below 110° F. Milling time varies depending upon the type and size of mill used but often ranges form 2 to 15 hours. In certain embodiments, the milling process is considered complete by comparing visual appearance of drawdowns on flat steel panels with standards generated from a previous acceptable material.

Another advantage that has been discovered with respect to the foregoing process is that the milling process can be conducted in the substantial or complete absence of conventional lubricants, such as higher fatty acids, including stearic acid and oleic acid. It is believed, without being bound by any theory, that the presence of such lubricants can detrimentally affect the ability of the resulting coating to adhere to subsequently applied coatings. As a result, in certain embodiments, the processes of the present invention comprise converting generally spherical metal particles into non-spherical metal particles in the substantial absence or, in some cases, complete absence of mineral spirits, a long chain fatty acid, such as stearic acid and oleic acid, a fluorocarbon resin, small pieces of aluminum foil, and/or any other conventional lubricant.

In certain embodiments, another coating is deposited over at least a portion of the previously described coating. In particular, in certain embodiments of the present invention, an electrodepositable coating composition is deposited over at least a portion of the previously described coating by an electrodeposition process.

Any suitable electrodeposition process and electrodepositable coating composition may be used in accordance with the present invention. As will be appreciated by those skilled in the art, in the process of applying an electrodepositable coating composition, an aqueous dispersion of the composition is placed in contact with an electrically conductive anode and cathode. Upon passage of an electric current between the anode and cathode, an adherent film of the electrodepositable composition deposits in a substantially continuous manner on the substrate serving as either the anode or the cathode depending on whether the composition is anionically or catonically electrodepositable.

In certain embodiments, the electrodepositable coating composition comprises a resinous phase dispersed in an aqueous medium. The resinous phase includes a film-forming organic component which can comprise an anionic film-forming organic component or a cationic film-forming organic component. In certain embodiments, the electrodepositable coating composition comprises an active hydrogen group-containing ionic resin and a curing agent having functional groups reactive with the active hydrogens of the ionic resin.

Non-limiting examples of anionic electrodepositable coating compositions include those comprising an ungelled, water-dispersible electrodepositable anionic film-forming resin. Examples of film-forming resins suitable for use in anionic electrodeposition coating compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Yet another suitable electrodepositable anionic resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, line 1 to col. 10, line 13, the cited portion of which being incorporated herein by reference.

By "ungelled" is meant that the polymer is substantially free of crosslinking and has an intrinsic viscosity when dissolved in a suitable solvent. The intrinsic viscosity of a polymer is an indication of its molecular weight. A gelled polymer, since it is of essentially infinitely high molecular weight, will have an intrinsic viscosity too high to measure.

A wide variety of cationic polymers are known and can be used in the present invention so long as the polymers are "water dispersible," i.e., adapted to be solubilized, dispersed, or emulsified in water. The water dispersible resin is cationic in nature, that is, the polymer contains cationic functional groups to impart a positive charge. Often, the cationic resin also contains active hydrogen groups.

Non-limiting examples of suitable cationic resins are onium salt group-containing resins, such as ternary sulfonium salt group-containing resins and quaternary phosphonium salt-group containing resins, for example, those described in U.S. Pat. Nos. 3,793,278 and 3,984,922, respectively. Other suitable onium salt group-containing resins include quaternary ammonium salt group-containing resins, for example, those that are formed from reacting an organic polyepoxide with a tertiary amine salt, as described in U.S. Pat. Nos. 3,962,165; 3,975,346; and 4,001,101. Also suitable are amine salt group-containing resins, such as the acid-solubilized reaction products of polyepoxides and primary or secondary amines such as those described in U.S. Pat. Nos. 3,663,389; 3,984,299; 3,947,338 and 3,947,339.

In certain embodiments, the above-described salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338.

Also, one-component compositions as described in U.S. Pat. No. 4,134,866 and DE-OS No. 2,707,405 can be used as the cationic resin. Besides the epoxy-amine reaction products, resins can also be selected from cationic acrylic resins such as those described in U.S. Pat. Nos. 3,455,806 and 3,928,157. Also, cationic resins which cure via transesterification, such as described in European Application No. 12463, can be used. Further, cationic compositions prepared from Mannich bases, such as described in U.S. Pat. No. 4,134,932, can be used. Also useful are positively charged resins that contain primary and/or secondary amine groups, such as is described in U.S. Pat. Nos. 3,663,389; 3,947,339; and 4,115,900.

In certain embodiments, the cationic resin is present in the electrodepositable coating composition in amounts of 1 to 60 weight percent, such as 5 to 25 weight percent, with the weight percents being based on total weight of the composition.

As previously discussed, the electrodepositable coating compositions which are useful in the present invention often further comprise a curing agent which contains functional groups which are reactive with the active hydrogen groups of the ionic resin. Suitable aminoplast resins, which are often used as curing agents for anionic electrodepositable coating compositions, are commercially available from American Cyanamid Co. under the trademark CYMEL® and from Monsanto Chemical Co. under the trademark RESIMENE®. In certain embodiments, the aminoplast curing agent is utilized in conjunction with the active hydrogen containing anionic electrodepositable resin in amounts ranging from 5 to 60 percent by weight, such as 20 to 40 percent by weight, based on the total weight of the resin solids in the electrodepositable coating composition.

Blocked organic polyisocyanates are often used as curing agents for cationic electrodepositable coating compositions and may be fully blocked or partially blocked, as described above. Specific examples include aromatic and aliphatic polyisocyanates, including cycloaliphatic polyisocyanates, such as diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate, as well as higher polyisocyanates, such as triisocyanates, and isocyanate prepolymers with polyols such as neopentyl glycol and trimethylolpropane and with polymeric polyols such as polycaprolactone diols and triols (NCO/OH equivalent ratio greater than 1). The polyisocyanate curing agents are often utilized in conjunction with the cationic resin in amounts ranging from 1 to 65 percent by weight, such as 5 to 45 percent by weight, based on the weight of the total resin solids in the coating composition.

The electrodepositable coating compositions utilized in the present invention are typically in the form of an aqueous dispersion. The term "dispersion" refers to a two-phase transcoating, translucent or opaque resinous system in which the resin is in the dispersed phase and the water is in the continuous phase. The resinous phase generally has an average particle size of less than 1 micron, such as less than 0.5 microns, or, in some cases, less than 0.15 micron.

In certain embodiments, the concentration of the resinous phase in the aqueous medium is at least 1 percent by weight, such as 2 to 60 percent by weight, based on the total weight of the aqueous dispersion. When such compositions are in the form of resin concentrates, they often have a resin solids content of 20 to 60 percent by weight, based on weight of the aqueous dispersion.

In addition, the aqueous medium may contain a coalescing solvent. Useful coalescing solvents include hydrocarbons, alcohols, esters, ethers and ketones. The amount of coalescing solvent, if any, is generally between 0.01 and 25 percent, such as 0.05 to 5 percent by weight, based on total weight of the aqueous medium.

A pigment composition and, if desired, various additives, such as surfactants, wetting agents or catalysts can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. In certain embodiments, the electrodepositable coating composition comprises a colorant that results in the production of a dark-colored, such as an optically black, electrodepositable coating composition. In certain embodiments, the dark-colored electrodepositable coating composition is capable of producing a coating having a CIELAB L* value of no more than 40, such as no more than 30, or, in some cases, no more than 20.

The pigment content of the dispersion is usually expressed as a pigment-to-resin ratio. In certain embodiments, when pigment is employed, the pigment-to-resin ratio is usually within the range of 0.02 to 1:1. The other additives mentioned above are often in the dispersion in amounts of 0.01 to 3 percent by weight based on weight of resin solids in the composition.

In certain embodiments of the present invention, the electrodepositable coating composition is deposited onto the substrate so as to result in a relatively thin film, i.e., a dry film thickness of no more than 0.5 mils (12.7 microns), in some cases no more than 0.2 mils (5.1 microns). Such compositions may be applied to the metal substrate using any suitable apparatus, such as, for example, one of the methods and/or apparatus described in one or more of United States Published Patent Application Nos. 2006/0032751A1; 2006/0032748A1; 2006/0049062A1; 2006/0051512A1, and 2006/0051511A1.

It has been surprisingly discovered that it is possible to produce metal articles coated with a multi-component composite coating comprising (i) a dark-colored zinc-rich primer coating and (ii) a dark-colored electrodeposited coating deposited over at least a portion of the zinc-rich primer coating, which can exhibit excellent adhesion and corrosion resistance properties, even when relatively low film thicknesses are used. As used herein, the term "dark-colored zinc-rich primer coating" refers to a dark-colored coating deposited from a dark-colored zinc-rich primer composition. As used herein, the term "dark-colored electrodeposited coating" refers to a dark-colored coating deposited, by an electrodeposition process, from an aqueous dark-colored electrodepositable composition. As used herein, when it is stated that a coating is "deposited over" another coating, it is meant encompass scenarios where the coating is applied directly to the other coating, with no intervening coating layers being present, as well as situations where an intervening coating layer separates the two coatings. In certain embodiments of the present invention, however, the dark-colored electrodeposited coating is deposited directly over at least a portion of the dark-colored zinc-rich primer, with no intervening coating layers being present.

In certain embodiments, therefore, the present invention is directed to metal articles at least partially coated with a multi-component composite coating comprising: (a) a dark-colored zinc-rich primer coating; and (b) a dark-colored electrodeposited coating deposited over at least a portion of the dark-colored zinc-rich primer coating, wherein, in certain embodiments, the article is resistant to corrosion when tested in accordance with ASTM B 117 after 500 hours of exposure, in some cases after 700 hours of exposure, or, in yet other cases, after 1000 hours of exposure, when the total combined dry film thickness of the dark-colored zinc-rich primer and the dark-colored electrodeposited coating is 1.5 mils or less (38.1 microns), in some cases 1 mil (25.4 microns) or less. As used herein, when it is stated that an article is "resistant to corrosion" it means that the portion of the article coated with the multi-component composite coating has no red rust visible to the naked eye after exposure in accordance with ASTM B 117 for a specified period of time, wherein the article is placed in a chamber kept at constant temperature where it is exposed to a fine spray (fog) of a 5 percent salt solution, rinsed with water and dried. Furthermore, when it is stated in this application that an article is resistant to corrosion "after 500 hours of exposure" it is meant that the article is resistant to corrosion when so tested for 500 hours exactly as well as articles resistant to corrosion when so tested after a selected number of hours greater than 500 hours, such as a selected number of hours between 500 and 1000 hours. Likewise, when it is stated in this application that an article is resistant to corrosion "after 700 hours of exposure" or "after 1000 hours of exposure" it is meant that the article is resistant to corrosion when so tested for 700 hours or 1000 hours exactly as well as articles resistant to corrosion when so tested after a selected number of hours greater than 700 hours or 1000 hours.

It has also been found that such multi-component composite coatings adhere to each other and to metal substrates. Adhesion, for purposes of the present invention, is measured using a Crosshatch adhesion test wherein, using a multi-blade cutter (commercially available from Paul N. Gardner Co., Inc.), a coated substrate is scribed twice (at 90° angle), making sure the blades cut through all coating layers into the substrate. Coating adhesion is measured using Nichiban L-24 tape (four pulls at 90°). Four purposes of the present invention, a coating is considered to "adhere to a metal substrate" if at least 80%, in some cases, 90% or more, of the coating adheres to the substrate after this test.

By successfully employing a dark-colored zinc-rich primer coating in combination with a dark-colored electrodeposited coating (in certain embodiments the difference in L* value between the zinc-rich primer coating and the electrodeposited coating is no more than 40, such as no more than 30, or, in some cases, no more than 25 units), the present invention can, in many cases, overcome problems associated with the unsightly "touch points" previously described. In particular, when coated parts with "touch points" are separated from each other such that at least some of a dark-colored electrodeposited coating is removed from the part at or around the touch point, the zinc-rich primer coating, which is also dark-colored, may not be particularly noticeable, unlike as would be the case if a light, silver-colored, zinc-rich primer coating (as is common) had been deposited under a dark-colored electrodeposited coating (as is common).

As will be appreciated, the coated articles described herein may also include a decorative and/or protective topcoating applied over the dark-colored zinc-rich primer or the multi-component composite coatings previously described. Such topcoatings may be deposited from any composition of the type conventionally used in automotive OEM compositions, automotive refinish compositions, industrial coatings, architectural coatings, electrocoatings, powder coatings, coil coatings, and aerospace coatings applications. Such compositions typically include film-forming resins, such as, for example, the materials described in U.S. Pat. No. 6,913,830 at col. 3, line 15 to col. 5, line 8, the cited portion of which being incorporated herein by reference. Such coating compositions may be applied using any conventional coating technique and utilizing conditions that will be easily determinable by those skilled in the art.

The present invention is also directed to methods for providing metal articles that comprise a surface that is resistant to corrosion when tested in accordance with ASTM B117 after 500 hours of exposure. These methods comprise: (a) depositing a dark-colored zinc-rich primer coating over at least a portion of the surface, wherein the dark-colored zinc-rich primer coating is deposited from a dark-colored zinc-rich primer composition comprising: (i) dark-colored zinc flakes present in the composition in an amount of at least 25 percent by weight, based on the total solids weight of the composition, and (ii) a binder formed from a titanate; and (b) electrodepositing a dark-colored coating over at least a portion of the dark-colored zinc-rich primer coating, wherein the total combined dry film thickness of the dark-colored zinc-rich primer and the dark-colored electrodeposited coating is no more than 1.5 mils (38.1 microns).

As should also be apparent from the foregoing description, the present invention is also directed to metal articles at least partially coated with a multi-component composite coating comprising: (a) a dark-colored zinc-rich primer coating; and (b) a dark-colored electrodeposited coating deposited over at least a portion of the dark-colored zinc-rich primer coating, wherein the total combined dry film thickness of the dark-colored zinc-rich primer and the dark-colored electrodeposited coating is no more than 1.5 mils (38.1 microns) and the articles are resistant to corrosion when tested in accordance with ASTM B117 after 500 hours of exposure.

Illustrating the invention are the following examples that are not to be considered as limiting the invention to their details. All parts and percentages in the examples, as well as throughout the specification, are by weight unless otherwise indicated.

EXAMPLES

Example 1

Charge 2 and 3 from Table 1 were premixed together then added with agitation over a 5 minute period into Charge 1 in a round bottom flask fitted with an agitation blade, a condenser, a distillate trap, and continuous nitrogen feed. After 30 minutes the temperature was raised until distillation occurred. After 24 grams of distillate was removed, Charge 4 was added. The resulting material was amber in color and was pourable at room temperature.

TABLE 1

| Charge # | Material | Amount (grams) |
|---|---|---|
| 1 | Tyzor ® TnBT[1] | 200 |
| 2 | Deionized Water | 7.1 |
| 3 | MACOL ® 98B[2] | 94.6 |
| 4 | Solvent Blend<br>24% benzyl alcohol<br>23% toluene<br>24% MIBK<br>24% SOLVESSO ® 100[3]<br>5% n-butanol | 24 |

[1]Tetra-n-butyl titanate commercially available from E.I. duPont de Nemours and Co.
[2]Bis-phenol A-ethylene oxide diol commercially available from BASF.
[3]Commercially available from Exxon Chemicals America.

Example 2

Charge 1 from Table 2 was blended with Charge 4 and half of Charge 5 until homogeneous. Charge 3 was then added under agitation. The mixture was heated to 120° F. and held for 15 minutes. Charge 2 was added slowly under agitation until well incorporated and free of lumps. The remainder of Charge 5 was added and mixed for one hour.

TABLE 2

| Charge # | Material | Amount (grams) |
|---|---|---|
| 1 | Binder of Example 1 | 75.77 |
| 2 | Zinc Dust SF7[4] | 204.75 |
| 3 | M-P-A 4020 X[5] | 3.50 |
| 4 | Ethyl Cellulose N-200[6] | 2.72 |
| 5 | Solvent Blend | 77.00 |

TABLE 2-continued

| Charge # | Material | Amount (grams) |
|---|---|---|
| | 24% benzyl alcohol<br>23% toluene<br>24% MIBK<br>24% SOLVESSO ® 100<br>5% n-butanol | |

[4]Zinc powder having an average particle size of 2.5 to 4.5 microns, commercially available from U.S. Zinc.
[5]Rheology additive commercially available from Elementis Specialties, Inc.
[6]Commercially available from Hercules Co.

Example 3

Charge 1 from Table 3 was blended with Charge 2 and the mixture blended under agitation until the reaction was complete as evidenced by the mixture becoming clear. Charge 5 and half of Charge 6 were added and blended until homogeneous and Charge 5 was completely dissolved. Charge 3 was then added under agitation. The mixture was heated to 120° F. and held for 15 minutes. Charge 4 was added slowly under agitation until well incorporated and free of lumps. The remainder of Charge 5 was added and mixed for one hour.

TABLE 3

| Charge # | Material | Amount (grams) |
|---|---|---|
| 1 | Tyzor ® TOT[7] | 57.00 |
| 2 | MACOL ® 98B | 3.00 |
| 3 | M-P-A 4020 X | 2.37 |
| 4 | Zinc Dust SF7 | 179.6 |
| 5 | Ethyl Cellulose N-200 | 2.43 |
| 6 | Solvent Blend<br>24% benzyl alcohol<br>23% toluene<br>24% MIBK<br>24% SOLVESSO ® 100<br>5% n-butanol | 84.00 |

[7]Tetra-2-ethylhexyl titanate commercially available from E.I. duPont de Nemours and Co.

Example 4

Charge 1 from Table 4 was blended with Charge 2 and the mixture blended under agitation until the reaction was complete as evidenced by the mixture becoming clear. Charge 3 was added and stirred for 15 minutes. Charge 4 and then Charge 5 were added slowly under agitation until well incorporated and free of lumps. Charge 6 was then added and mixed for one hour.

TABLE 4

| Charge # | Material | Amount (grams) |
|---|---|---|
| 1 | Tyzor ® TOT | 57.00 |
| 2 | MACOL ® 98B | 3.00 |
| 3 | BYK ®-410[8] | 1.86 |
| 4 | Zinc Dust SF7 | 170.60 |
| 5 | STAPA ® 4 ZnSn15[9] | 10.00 |
| 6 | Solvent Blend<br>24% benzyl alcohol<br>23% toluene<br>24% MIBK<br>24% SOLVESSO ® 100<br>5% n-butanol | 30.00 |

[8]Rheological additive commercially available from BYK-Chemie.
[9]Zinc/tin alloy flake paste commercially available from Eckhart-Werke.

Comparative Example C1

Charge 1 from Table 5 was blended with Charge 2 and the mixture blended under agitation until the reaction was complete as evidenced by the mixture becoming clear. Charge 5 and half of Charge 6 were added and blended until homogeneous and Charge 5 was completely dissolved. Charge 3 was then added under agitation. The mixture was heated to 120° F. and held for 15 minutes. Charge 4 was added slowly under agitation until well incorporated and free of lumps. The remainder of Charge 5 was added and mixed for one hour.

TABLE 5

| Charge # | Material | Amount (grams) |
|---|---|---|
| 1 | Tyzor ® TOT | 62.2 |
| 2 | MACOL ® 98B | 3.27 |
| 3 | M-P-A 4020 X | 2.00 |
| 4 | STAPA ® 4 ZnAl 7[10] | 146.70 |
| 5 | Ethyl Cellulose N-200 | 2.00 |
| 6 | Solvent Blend<br>24% benzyl alcohol<br>23% toluene<br>24% MIBK<br>24% SOLVESSO ® 100<br>5% n-butanol | 69.00 |

[10]Zinc/Aluminum alloy flake paste commercially available from Eckhart-Werke.

Examples 5-11

In Examples 5-11 of Table 6, the effect of organic modification or hybridization of titanate materials is demonstrated. For examples 5 through 11, the materials were blended by mechanical stirring at 25° C. until the reaction was complete as evidenced by a clear, homogeneous product. For examples 7 through 11, the mixtures were turbid and cloudy at first and became clear after approximately one hour of reaction time. All were fluid at room temperature.

TABLE 6

| | Example | | | | | | |
|---|---|---|---|---|---|---|---|
| | 5 (grams) | 6 (grams) | 7 (grams) | 8 (grams) | 9 (grams) | 10 (grams) | 11 (grams) |
| TYZOR ® TOT | 10.0 | — | — | — | — | — | 11.43 |
| TYZOR ® BTP[11] | — | 10.0 | 12.0 | 13.3 | 11.7 | 10.0 | — |
| MACOL ® 98B | — | — | 0.4 | 1.0 | 1.5 | 3.0 | — |
| TERATHANE ® 1000[12] | — | — | — | — | — | — | 0.4 |
| Solvent Blend of Example 1 | 1.0 | 1.0 | 2.0 | 2.0 | 2.0 | 3.0 | 1.0 |

[11]n-butyl polytitanate commercially available from E.I. DuPont de Nemours and Co.
[12]Polytetramethylene ether glycol, commercially available from INVISTA.

Application and Testing

The compositions of Examples 2, 3, 4, and C1 were applied to clean, sand blasted bolts by a dip spin method in a basket with a radius of 4 cm at a speed of 350 rpm for 15 seconds. The bolts were then baked at 200° C. for 20 minutes. In addition, the compositions were applied to clean cold rolled steel panels by drawdown bar method, and baked at 200° C. for 20 minutes. The resulting film thickness was approximately 8 microns. Subsequently, the coated bolts were topcoated by electrodeposition with Powercron 6100XP (black cationic Bisphenol A epoxy based electrocoat commercially available from PPG Industries, Inc.) for a total primer plus topcoat film thickness of approximately 16 microns, as measured using in accordance with ASTM B244 using a FISHERSCOPE® MMS thicknessmeter, as described above. Similarly, each primer coated steel panel was topcoated with electrocoat over half of its surface area. The electrocoat was cured by baking at 180° C. for 30 minutes.

The bolts were mounted on plastic panels and placed in a salt spray cabinet compliant with ASTM B117 standard. They were tested in sets of ten bolts for each example. The point of failure was defined as the number of hours of exposure required to generate the visible appearance of any red rust spots on more than two of the ten bolts in the set.

Adhesion testing was done by crosshatch as described above. Crosshatch was tested on primer only as well as primer plus electrocoated topcoat on the flat steel panels described above.

The products of examples 5 through 11 were applied to flat, clean cold rolled steel panels by conventional drawdown method then baked at 200° C. for 20 minutes. The resulting dry film thickness was approximately 4-5 microns. The resulting films were evaluated for film integrity visual inspection, thumbnail scratching, rubbing with an acetone soaked rag, and visual assessment of the extent of film cracking when examined by Scanning Electron Microscope (SEM) at 500× magnification.

Results are set forth in Tables 7 and 8

TABLE 7

| | Example | | | |
|---|---|---|---|---|
| | 1 | 5 | 6 | 7 |
| Appearance | Smooth, dull | powdery, rough | powdery, rough | slightly powdery, very cloudy |
| Thumbnail Scratch | no scratch | very easy | very easy | easy |

TABLE 7-continued

| | | | | |
|---|---|---|---|---|
| Acetone soaked rag rub | 100 rubs had no effect | rubbed off easily | rubbed off easily | 5 rubs through to metal |
| 500x (SEM) cracking appearance 500X | no cracks, continuous film | powdery, no continuous film | powdery, no continuous film | mud cracks with large gaps and flaking |
| Crosshatch Adhesion | no loss (100% adhesion) | complete loss | complete loss | no loss (100% adhesion) |

| | Example | | | |
|---|---|---|---|---|
| | 8 | 9 | 10 | 11 |
| Appearance | smooth, slightly cloudy | smooth, clear | smooth, clear | smooth, dull |
| Thumbnail Scratch | easy | Difficult | no scratch | difficult |
| Acetone soaked rag rub | 100 rubs has no effect | 100 rubs has no effect | 100 rubs has no effect | 100 rubs has no effect |
| 500x (SEM) cracking appearance 500X | more continuous, less cracking with narrower gaps, no flaking (vs 7) | less cracking, very narrow gaps, no flaking (vs 8) | Very little cracking, narrow gaps, mostly continuous, no flaking (vs 9) | very similar to 8 |
| Crosshatch Adhesion | no loss (100% adhesion) | no loss (100% adhesion) | no loss (100% adhesion) | no loss (100% adhesion) |

TABLE 8

| | Example | | | |
|---|---|---|---|---|
| | 2 | 3 | 4 | C1 |
| Salt Spray (Hours) | 500 | 500 | 700 | 50 |
| Crosshatch Adhesion Primer only | no loss | no loss | no loss | complete loss |
| Crosshatch Adhesion Primer plus Electrocoat | no loss | no loss | no loss | complete loss |

Examples 12-14

In Examples 12-14 of Table 9, the effect of modification or hybridization of titanate materials with a silicon-based polymer is demonstrated. For examples 13 and 14, the mixtures required approximately 8 hours to react and become clear. All were fluid at room temperature.

TABLE 9

| | Example | | |
|---|---|---|---|
| | 12 (grams) | 13 (grams) | 14 (grams) |
| TYZOR ® TOT | 10.0 | 10.0 | 10.0 |
| Dow Corning ® 840 Resin[13] | — | 1.0 | — |
| SILIKOFTAL ® HTT[14] | — | — | 0.6 |
| Solvent Blend of Example 1 | 1.0 | 1.0 | 1.0 |

[13] Silanol functional silicone resin available from Dow Corning.
[14] Polyester silicone resin available from Degussa.

The products of examples 12 through 14 were applied to flat, clean cold rolled steel panels by conventional drawdown method then baked at 200° C. for 20 minutes. The resulting dry film thickness was approximately 4-5 microns. The resulting films were evaluated for film integrity visual inspection, thumbnail scratching, rubbing with an acetone soaked rag, and visual assessment of the extent of film cracking when examined by Scanning Electron Microscope (SEM) at 500× magnification. Results are set forth in Table 10.

TABLE 10

| | Example | | |
|---|---|---|---|
| | 12 | 13 | 14 |
| Appearance | brown, rough, powdery | Clear, smooth | Clear, smooth |
| Thumbnail Scratch | very easy | difficult | difficult |
| Acetone soaked rag rub | through in 30 rubs | 100 rubs no effect | 100 rubs no effect |
| 500x (SEM) cracking appearance 500X | severe mud cracking, large gaps and some flaking | less mud cracking and small gaps versus 12 | more continuous, less cracking versus 13 |
| Crosshatch Adhesion | no loss (100% adhesion) | no loss (100% adhesion) | no loss (100% adhesion) |

Examples 15-17

Examples 15 and 17 were prepared from the ingredients set forth in Table 11.

TABLE 11

| | | Example | |
|---|---|---|---|
| Charge # | Material | Example 15 Amount (grams) | Example 17 Amount (grams) |
| 1 | Tyzor ® TOT | 2916 | 433 |
| 2 | MACOL ® 98B | 154 | 23 |
| 3 | BYK-410 | 48 | 6 |
| 4 | Zinc Dust SF7 | 9187 | — |
| 5 | Zinc 8[15] | — | 1241 |
| 6a | Ethyl Cellulose N-200 | 124 | — |
| 7 | Benzyl Alcohol | — | 55 |
| 8 | n-Butanol | — | 110.8 |
| 6 | Solvent Blend 24% benzyl alcohol 23% toluene 24% MIBK 24% SOLVESSO ® 100 5% n-butanol | 1184 | 36 |

[15] Zinc flake paste in mineral spirits available from Eckart-America.

Example 15 was prepared in a manner similar to Example 3. Charge 1 from Table 11 was blended with Charge 2 and the mixture blended under agitation until the reaction was complete as evidenced by the mixture becoming clear. Charge 6a and half of charge 6 were added and blended until homogeneous and Charge 6a was completely dissolved. Charge 3 was then added under agitation. The mixture was then heated to 120° F. and held for 15 minutes. Charge 4 was added slowly under agitation until well incorporated and free of lumps. The remainder of Charge 6 was added and mixed for one hour.

Example 17 was prepared in a manner similar to Example C1. Charge 1 from Table 11 was blended with Charge 2 and the mixture blended under agitation until the reaction was complete as evidenced by the mixture becoming clear. Charge 3 was then added under agitation followed by Charges 6, then 5, then 7, then 8. Agitation was continued for 30 minutes.

Example 16 was prepared by processing 1700 grams of the composition prepared in Example 15 in a media mill (Chicago Boiler L-3-J) which was charged with 2400 grams of 1.7-2.4 milimeter ceramic zirconium media. This was milled at 90° F. at 2400 rpm for three hours. The material turned from a dark gray color to a very silvery color, indicating the formation of non-spherical zinc particles.

Application and Testing of Examples 15-17

The compositions of Examples 15, 16, and 17 were applied to flat, clean, zinc-phosphated cold rolled steel panels by conventional drawdown method and then baked at 200° C. for 20 minutes. The resulting dry film thickness was approximately 6-8 microns. Subsequently, the coated panels were topcoated by electrodeposition with Powercron XP (black cationic Bisphenol A epoxy based electrocoat, commercially available from PPG Industries, Inc. according to the manufacturer instructions for a total primer plus topcoat film thickness of approximately 15-17 microns, as measured in accordance with ASTM B244 using a FISHERSCOPE® MMS thicknessmeter, as described above. Similarly, each primer coated steel panel was topcoated with electrocoat over half of its surface area. The electrocoat was cured by baking at 180° C. for 30 minutes.

The resulting panels were placed in a salt spray cabinet compliant with ASTM B117 standard. Adhesion testing was done by crosshatch as described above. Crosshatch was tested on primer only as well as primer plus electrocoat. Results are set forth in Table 12.

Figure 1B:
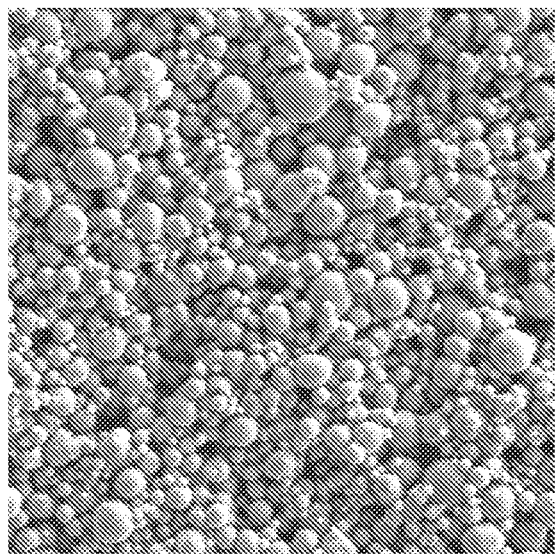
Figure 2A:
FIGS. 2a and 2b are cross-sectional and surface SEM images (approximately 1000× magnification), respectively, of the coated substrate prepared in Example 16.
Figure 2B:
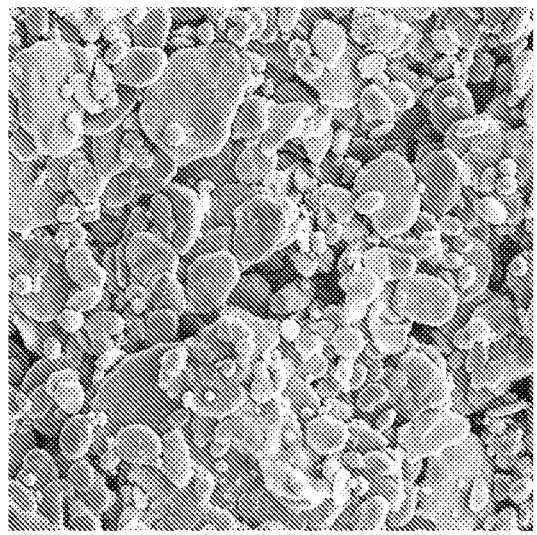
Figure 3A:
FIGS. 3a and 3b are cross-sectional and surface SEM images (approximately 1000× magnification), respectively, of the coated substrate prepared in Example 17.
Figure 3B:
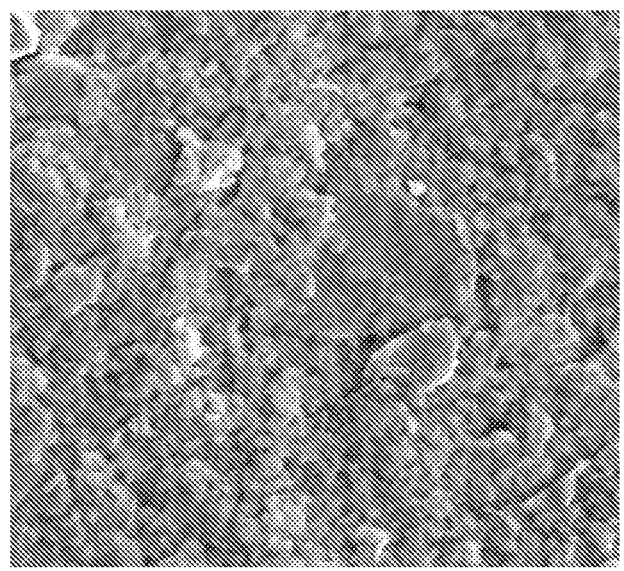

The SEM images of FIGS. 1 to 3 show that the milling process used in Example 16 produced non-spherical particles with significantly different shape from the commercially available flakes of Example 17. It is also clear that the coating produced from the composition of Example 16 had a more porous surface than the coating produced from the composition of Example 17.

TABLE 12

| | Example | | |
|---|---|---|---|
| | 15 | 16 | 17 |
| Salt Spray (hours) | 500<br>Red rust spots<br>No blisters | 1000<br>No red rust<br>No blisters | 336<br>Severe blisters<br>800<br>Red rust spots |
| Crosshatch Adhesion Primer only | no loss | no loss | complete loss |
| Crosshatch Adhesion Primer plus Electrocoat | no loss | no loss | complete loss |

Examples 18-20

Examples 18 and 19 were prepared from the ingredients set forth in Table 13.

TABLE 13

| | Example(s) | |
|---|---|---|
| Material | 18<br>Weight (grams) | 19<br>Weight (grams) |
| Tyzor ® TOT | 464.3 | 534.0 |
| Tyzor ® BTP | 111.7 | 132.0 |
| MACOL ® 98B | 24.7 | 28.4 |
| Benzyl Alcohol | 40.0 | 45.1 |
| n-Butanol | 118.0 | 118.6 |
| 2-Ethylhexanol | 39.3 | 83.1 |
| Solvesso 100 | 80.0 | — |
| Silquest A187 | 13.0 | 15.0 |
| Bentone SD2 | 13.0 | 15.0 |
| Zinc Dust SF7 | 1179.1 | — |
| Black Zinc Z2031 | — | 1314.1 |
| Oleic Acid | 2.6 | — |
| BYK-410 | 5.0 | 5.8 |

Example 18 was prepared in a manner similar to Example 15 by mixing the ingredients in order. 1700 grams of the compositions was then processed in a manner like Example 16.

Example 19 was prepared by mixing the ingredients in order and dispersing with a Cowles dispersion blade for 1 hour.

Example 20 was prepared by mixing 565.0 parts by weight of the product of Example 18 with 550.0 parts by weight of the product of Example 19 and dispersing with a Cowles dispersion blade for 1 hour.

Application and Testing of Examples 18-20

The compositions of Examples 18, 19, and 20 were applied to flat, clean, zinc-phosphated cold rolled steel panels by conventional drawdown method and then baked at 200° C. for 20 minutes. After thickness and color measurement, the panels were then topcoated by electrodeposition with Powercron XP (black cationic Bisphenol A epoxy based electrocoat, commercially available from PPG Industries, Inc.) according to the manufacturer instructions. The electrocoat was cured by baking at 180° C. for 30 minutes.

The resulting panels were placed in a salt spray cabinet compliant with ASTM B117 standard. Adhesion testing was performed by using a 5 tooth crosshatch tester with 2 mm spacing and subsequent tape adhesion testing. Results are set forth in Table 14 and are expressed as percent loss of the topcoat.

TABLE 14

| | Example | | |
|---|---|---|---|
| | 18 | 19 | 20 |
| Zinc Rich Primer film thickness[16] | 0.32 mil. | 0.29 mil. | 0.35 mil. |
| Crosshatch adhesion | <5% loss | <5% loss | <5% loss |
| Zinc Rich Primer film thickness[16] | 0.79 mil. | 0.81 mil. | 0.76 mil. |
| Crosshatch adhesion | 70% loss | <5% loss | 20% loss |
| L* value[17] | 68 | 32 | 52 |

[16]As measured in accordance with ASTM B244 using a FISHERSCOPE ® MMS thicknessmeter.
[17]Measured at an angle of 45° using an X-Rite MA-68 available from X-Rite, Incorporated, Grandville, Mich.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A dark-colored zinc-rich coating composition comprising:
   (a) at least 50 percent by weight, based on the total solids weight of the composition, of dark-colored zinc flakes; and
   (b) a film-forming binder comprising a hybrid copolymer formed from:
      (i) a titanate and/or a partial hydrolysate thereof, and
      (ii) a polyfunctional polymer having functional groups reactive with alkoxy groups of the titanate and/or the partial hydrolysate thereof,
   wherein the dark-colored zinc flakes are dispersed in the binder, and the binder excludes silicon with the proviso that the coating composition does not comprise zinc alloy flakes.

2. The coating composition of claim 1, further comprising zinc powder.

3. The coating composition of claim 1, wherein the binder is present in the composition in an amount of 2 to 10 percent by weight, based on the total weight of solids in the composition.

4. The coating composition of claim 1, wherein the dark-colored zinc flake comprise black zinc flake.

5. The coating composition of claim 1, wherein a coating deposited from the dark-colored zinc-rich coating composition is optically black.

6. The coating composition of claim 1, wherein a coating deposited from the dark-colored zinc-rich coating composition has a CIELAB L* value of no more than 60.

7. The coating composition of claim 1, wherein the coating composition is chrome-free.

8. The coating composition of claim 1, wherein the dark-colored zinc flakes comprise at least 70 percent by weight of the total solids weight of the composition.

9. The coating composition of claim 1, wherein the dark-colored zinc flakes comprise from 70 to 95 percent by weight of the total solids weight of the composition.

10. The coating composition of claim 1, wherein the dark-colored zinc flakes comprise from 85 to 95 percent by weight of the total solids weight of the composition.

11. The coating composition of claim 1, wherein the binder further comprises a reaction product of reactants comprising:
   (i) a titanate and/or a partial hydrolysate thereof; and
   (ii) a polyol comprising the reaction product of reactants comprising:
      (A) a polyol comprising an aromatic group; and
      (B) an alkylene oxide.

12. The coating composition of claim 11, wherein the polyol comprises a bisphenol.

13. The coating composition of claim 11, wherein the polyol comprises a diol.

14. The coating composition of claim 13, wherein the molar ratio of diol to alkylene oxide is from 1:1 to 1:10.

15. The coating composition of claim 11, wherein the polyol comprises a bisphenol and the molar ratio of alkylene oxide to bisphenol is 6:1.

16. The coating composition of claim 11, wherein the weight ratio of titanate to polyol is from 1 to 6 parts by weight titanate, measured on the basis of theoretical $TiO_2$ content in the binder, to 1 part by weight polyfunctional polyol.

17. The coating composition of claim 11, wherein the weight ratio of titanate to polyol is from 3 to 5 parts by weight titanate, measured on the basis of theoretical $TiO_2$ content in the binder, to 1 part by weight polyfunctional polyol.

18. A metal article at least partially coated with a multi-component composite coating comprising:
   (a) a dark-colored zinc-rich coating according to claim 1; and
   (b) a dark-colored electrodeposited coating deposited over at least a portion of the dark-colored zinc-rich primer coating,
   wherein the article is resistant to corrosion after 500 hours of exposure when the total combined dry film thickness of the dark-colored zinc-rich primer and the electrodeposited coating is no more than 1.5 mils.

19. The article of claim 18, wherein the dark-colored zinc-rich coating is deposited from a composition comprising black zinc flake.

20. The article of claim 19, wherein the black zinc flake is present in an amount of at least 25 percent by weight, based on the total weight of the zinc particles.

21. The article of claim 18, wherein the dark-colored zinc-rich coating is optically black.

22. The article of claim 18, wherein the dark-colored zinc-rich coating has a CIELAB L* value of no more than 60.

23. The article of claim 18, wherein the dark-colored zinc-rich coating has a CIELAB L* value of no more than 40.

24. The article of claim 18, wherein the polyfunctional polymer comprises a polyol.

25. The article of claim 24, wherein the polyol is formed from reactants comprising (i) a polyol comprising an aromatic group and (ii) an alkylene oxide.

26. The article of claim 18, wherein the binder is present in the composition in an amount of 2 to 10 percent by weight, based on the total weight of solids in the composition.

27. The article of claim 18, wherein the article is a small part.

28. The article of claim 18, wherein the dark-colored zinc-rich coating is chrome-free.

* * * * *